(12) United States Patent
Ohzawa

(10) Patent No.: US 9,591,166 B2
(45) Date of Patent: Mar. 7, 2017

(54) LIGHT GUIDE, ILLUMINATING DEVICE AND IMAGE READING APPARATUS

(71) Applicant: KONICA MINOLTA, INC., Chiyoda-ku, Tokyo (JP)

(72) Inventor: Satoko Ohzawa, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/001,723

(22) Filed: Jan. 20, 2016

(65) Prior Publication Data
US 2016/0212291 A1 Jul. 21, 2016

(30) Foreign Application Priority Data

Jan. 20, 2015 (JP) ................................. 2015-008543

(51) Int. Cl.
| | |
|---|---|
| *H04N 1/04* | (2006.01) |
| *H04N 1/028* | (2006.01) |
| *F21V 8/00* | (2006.01) |
| *G02B 27/10* | (2006.01) |
| *H04N 1/10* | (2006.01) |
| *G02B 6/00* | (2006.01) |

(52) U.S. Cl.
CPC ....... *H04N 1/02835* (2013.01); *G02B 6/0006* (2013.01); *G02B 27/106* (2013.01); *H04N 1/10* (2013.01); *G02B 2006/0098* (2013.01)

(58) Field of Classification Search
CPC .... H04N 1/02835; H04N 1/10; G02B 6/0006; G02B 27/106; G02B 2006/0098
USPC ................ 358/475, 484, 509; 399/220, 221; 355/67–70; 362/551
See application file for complete search history.

(56) References Cited

U.S. PATENT DOCUMENTS

| | | | |
|---|---|---|---|
| 6,989,916 B2* | 1/2006 | Lichtfuss ........... | H04N 1/00127 248/918 |
| 7,954,988 B2* | 6/2011 | Lee .................... | H04N 1/02815 362/551 |
| 8,279,499 B2 | 10/2012 | Wilsher | |
| 2004/0183774 A1* | 9/2004 | Manabe ............... | G02B 6/0018 345/102 |

(Continued)

FOREIGN PATENT DOCUMENTS

| | | | |
|---|---|---|---|
| JP | 2014-187444 A | | 10/2014 |
| JP | 2014216923 A | * | 11/2014 |

*Primary Examiner* — Cheukfan Lee
(74) *Attorney, Agent, or Firm* — Buchanan Ingersoll & Rooney PC

(57) ABSTRACT

A light guide having: a splitting section configured to split light emitted from a light source into at least two; and at least two light guiding sections arranged side by side in a predetermined width direction and configured to cause the light entering from the splitting section to propagate in a predetermined length direction. Each of the light guiding sections includes: a reflective section provided along the length direction and configured to reflect light incident thereon; an emission surface arranged opposite the reflective section and configured to emit the light reflected by the reflective section as a linear light beam having predetermined light distribution in the length direction; and at least a part of the emission surface is located farther in a direction opposite to the length direction than a forward end of the splitting section in the length direction.

21 Claims, 9 Drawing Sheets

(56) References Cited

U.S. PATENT DOCUMENTS

| | | | |
|---|---|---|---|
| 2004/0184287 A1* | 9/2004 | Smith | G02B 6/4298 362/560 |
| 2009/0034024 A1* | 2/2009 | Kim | H04N 1/02815 358/475 |
| 2009/0251897 A1* | 10/2009 | Kabuki | G02B 6/0018 362/235 |
| 2012/0261560 A1* | 10/2012 | Nomoto | G02B 6/0045 250/227.32 |
| 2012/0320599 A1* | 12/2012 | Tanaka | H04N 1/02835 362/296.01 |
| 2013/0044509 A1* | 2/2013 | Chung | G02F 1/133606 362/602 |
| 2014/0313738 A1* | 10/2014 | Tanaka | G02B 6/001 362/298 |
| 2015/0181070 A1* | 6/2015 | Tanaka | G02B 6/001 358/475 |

* cited by examiner

F I G . 5

| POSITION IN LENGTH DIR | EMBODIMENT | COMPARATIVE EXAMPLE |
|---|---|---|
| x3 | | |
| x2 | | |
| x5 | | |
| x4 | | |

F I G . 6
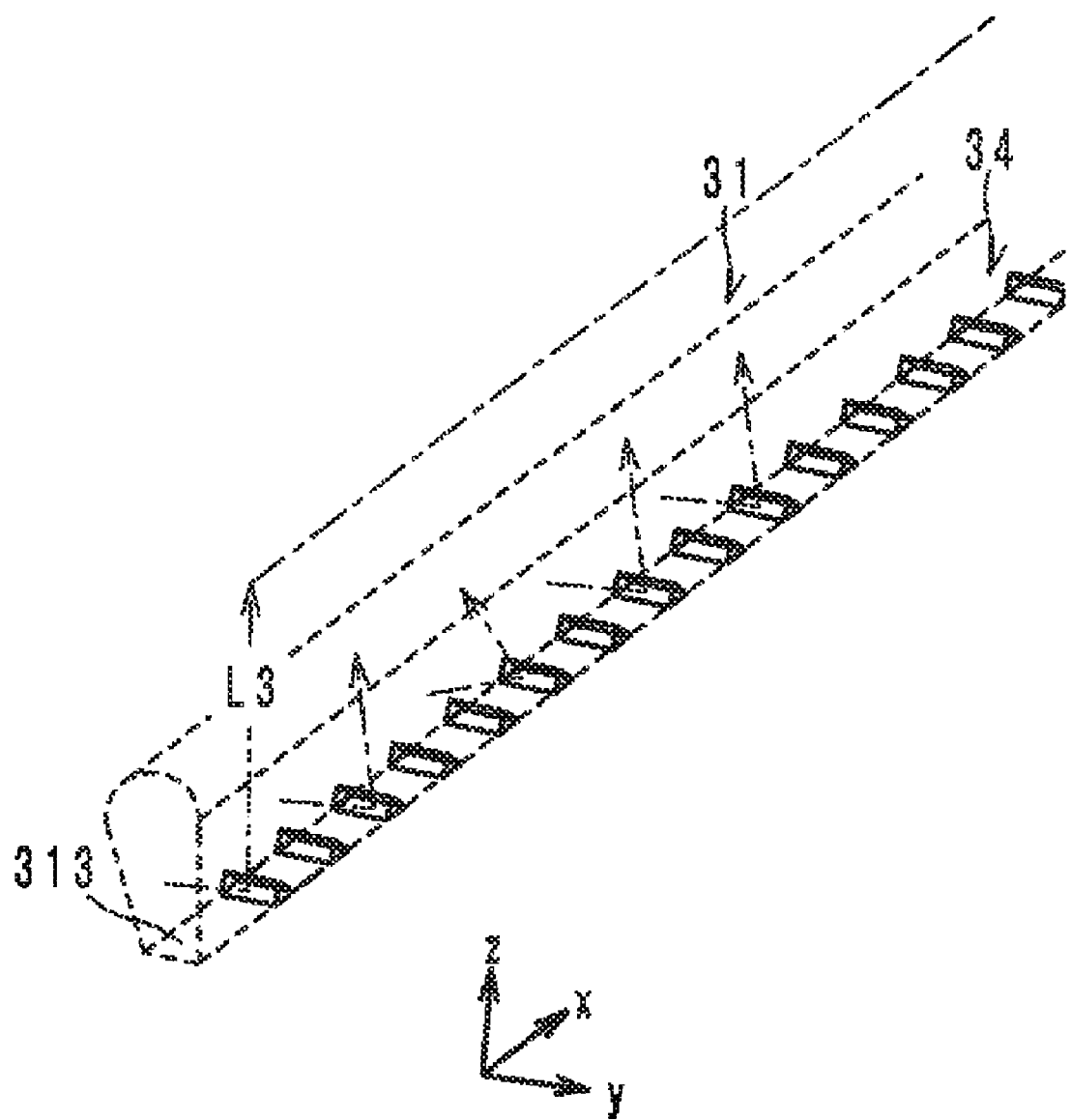

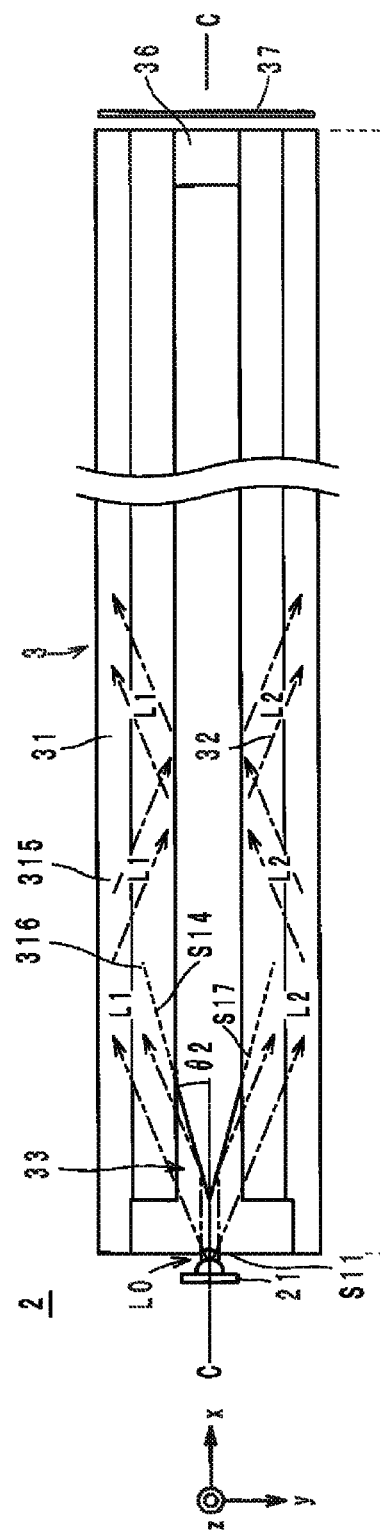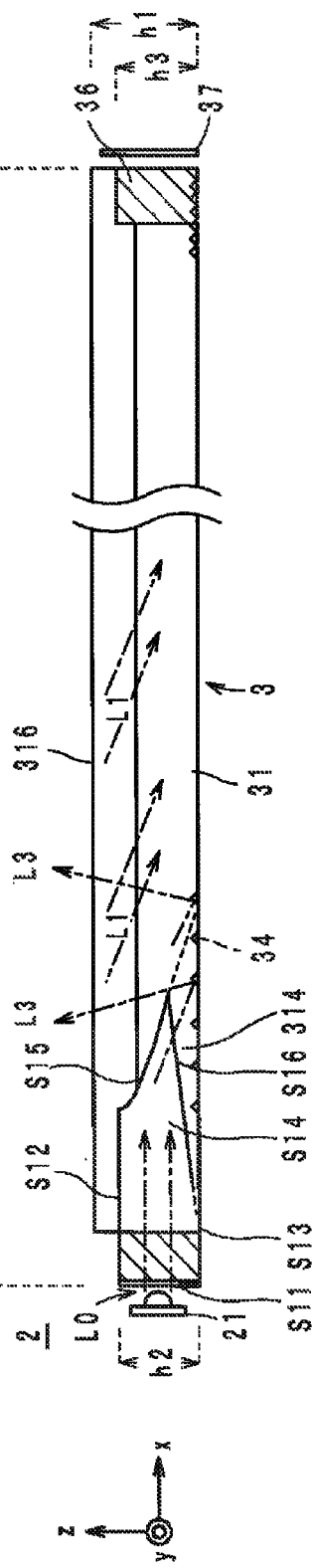
FIG. 7

LIGHT GUIDE, ILLUMINATING DEVICE AND IMAGE READING APPARATUS

This application claims benefit of priority to Japanese Patent Application No. 2015-008543 filed Jan. 20, 2015, the content of which is incorporated herein by reference.

BACKGROUND OF THE INVENTION

1. Field of the Invention

The present invention relates to a light guide configured to generate a plurality of linear light beams from a light beam emitted by a light source, and an illuminating device and an image reading apparatus using the light guide.

2. Description of Related Art

As examples of light guides of this kind, a light guide disclosed in Japanese Patent Laid-Open Publication No. 2014-187444 and a light guide disclosed in U.S. Pat. No. 8,279,499 are given. A light source is located to face an end of such a conventional light guide. A light beam entering from the light source is split by a beam splitter and directed into a plurality of rod-like light guiding sections arranged side by side with each other (arranged in the width direction). The light beam entering each of the rod-like light guiding sections propagates in the length direction of the light guiding sections while being total-reflected inside the light guiding section repeatedly.

At the bottom of each of the rod-like light guiding sections, a reflective section (for example, a group of prisms) is provided to reflect incident light upward. At the top of each of the rod-like light guiding sections, an exit surface is provided so as to be opposite the reflective section. The exit surface is designed so as to cause light entering from the reflective section, etc. to exit as a linear light beam such that a predetermined position can be irradiated with the linear light beam.

The above-described light guide is used in an image-forming apparatus, for example. In this case, the light guide generates a plurality of linear light beams extending in the length direction of the light guide, and a document is illuminated with the linear light beams. Light reflected by the document reaches a linear image sensor, which is composed of CCDs (charged coupled devices) or the like, via a mirror and a lens. The quantity of light passing through a peripheral portion of a lens is lower than the quantity of light passing thorough a center portion of the lens. Therefore, the reflective section of each of the rod-like light guiding sections is designed so as to achieve a larger quantity of light at both end portions of each of the rod-like light guiding sections than at a center portion thereof with respect to the length direction.

In such a conventional light guide, each of the rod-like light guiding sections (that is, each portion capable of emitting a linear light beam) extends substantially from the forward end in the length direction of the beam splitter, and light emitted from a portion of the rod-like light guiding section near the beam splitter is influenced by the beam splitter. Therefore, in order to achieve a large quantity of light at the both ends in the length direction, the reflecting section must be located sufficiently far away from the beam splitter in the length direction. Thus, in the conventional light guide, each of the rod-like light guiding sections must be enlarged in the length direction in order to achieve a proper linear light beam.

SUMMARY OF THE INVENTION

An object of the present invention is to provide a light guide having a reduced length as compared to conventional light guides, and an illuminating device and an image reading apparatus using the light guide.

According to an embodiment of the present invention, a light guide comprises: a splitting section configured to split light emitted by a light source into at least two; and at least two light guiding sections arranged side by side in a predetermined width direction and configured to cause the light entering from the splitting section to propagate in a predetermined length direction, wherein: each of the light guiding sections includes: a reflective section provided along the length direction and configured to reflect light incident thereon; and an emission surface arranged opposite the reflective section and configured to emit the light reflected by the reflective section as a linear light beam having predetermined light distribution in the length direction; and at least a part of the emission surface is located farther in a direction opposite to the length direction than a forward end of the splitting section in the length direction.

According to other embodiments of the present invention, an illuminating device comprises the light guide, and an image reading apparatus comprises the light guide.

BRIEF DESCRIPTION OF THE DRAWINGS

FIG. 5 is a diagram illustrating cross-sections of a beam splitter at various critical points in the length direction;

FIG. 6 depicts an exemplary structure of a first reflective section indicated in FIG. 3.

FIG. 7 depicts a process of emitting linear light beams from a light guide indicated in FIG. 2.

DETAILED DESCRIPTION OF THE PREFERRED EMBODIMENTS

1. Embodiment

Figure 1:
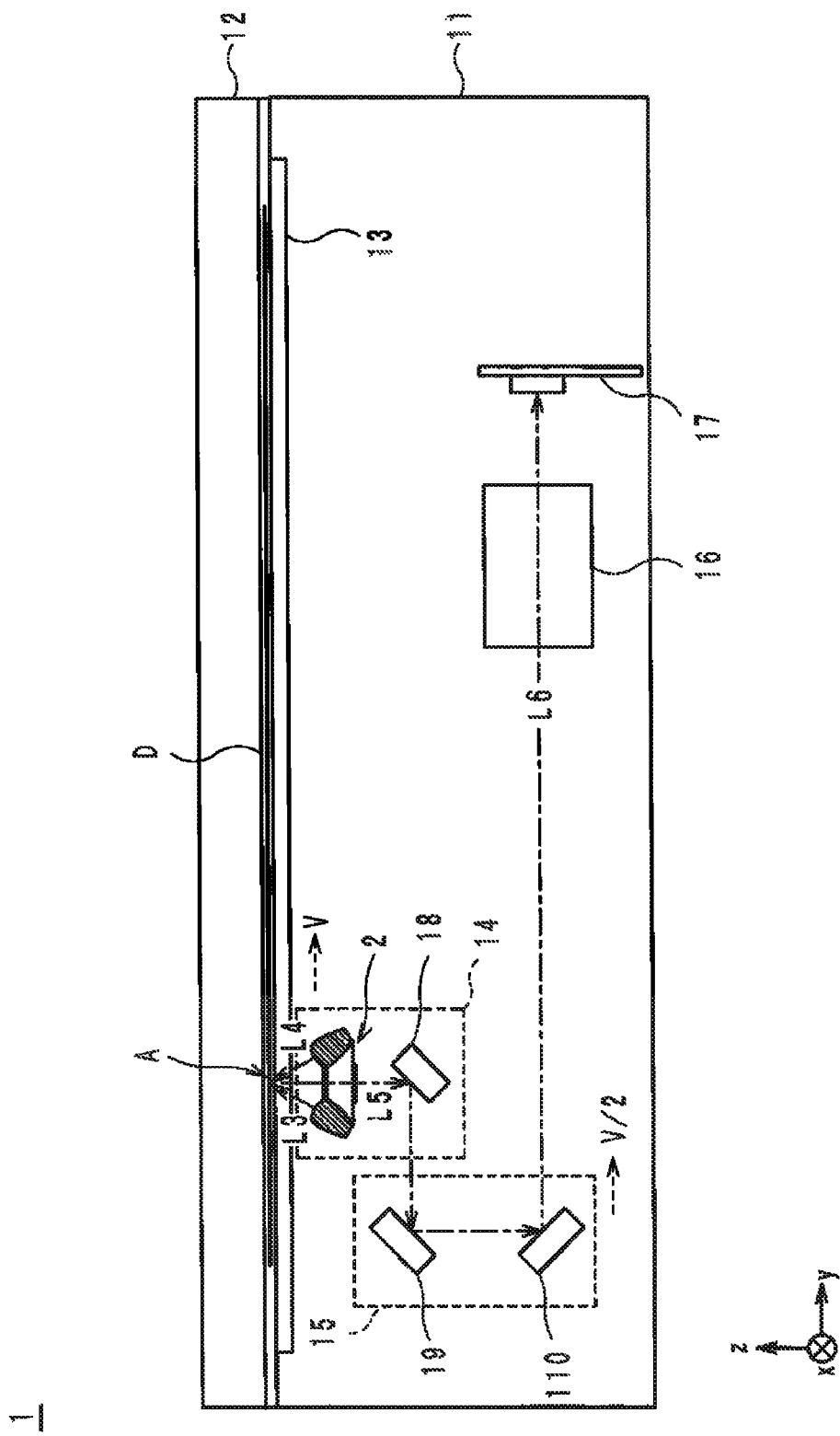
FIG. 1 is a schematic view illustrating the general structure of an image reading apparatus.
Figure 2:
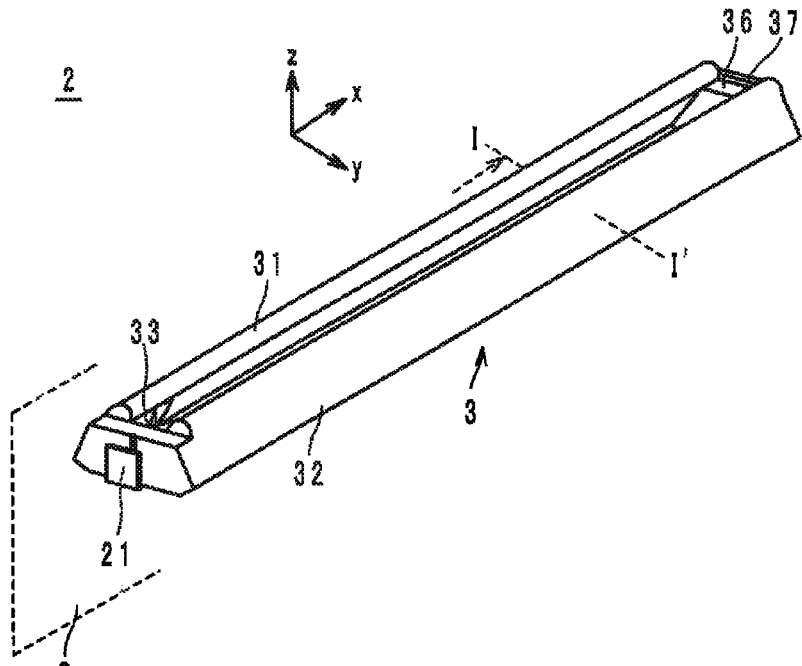
FIG. 2 is a perspective view of an illuminating device illustrated in FIG. 1.

With reference to the drawings, a light guide according to an embodiment, and an illuminating device and an image reading apparatus comprising the light guide will hereinafter be described.

2. Definitions

In the drawings, the x-direction indicates a direction from the front side to the rear side (length direction) of the image reading apparatus 1, the illuminating device 2 and the light guide 3. The x-direction also indicates a main scanning direction of the image reading apparatus 1. Further, the x-direction indicates an optical axis direction x of a light source 21, a length direction x of light guiding sections 31 and 32, and an extending direction x of linear light beams L3 and L4.

The y-direction indicates a direction from the left side to the right side (width direction) of the image reading apparatus 1, the illuminating device 2 and the light guide 3. The y-direction also indicates a sub-scanning direction y of the image reading apparatus 1, and a direction y in which the light guiding sections 31 and 32 are aligned with each other.

The z-direction indicates a direction from the bottom to the top (height direction) of the image reading apparatus 1, the illuminating device 2 and the light guide 3. The height direction z also indicates a component perpendicular to the length direction x and the width direction y of directions of emission of linear light beams L3 and L4 from the light guide 3 (see especially FIG. 3).

3. Structure of the Image Reading Apparatus

As illustrated in FIG. 1, the image reading apparatus 1 comprises a housing 11, a document cover 12, a platen glass 13, a first slider unit 14, a second slider unit 15, a focusing lens 16, a linear image sensor 17, an illuminating device 2, a first mirror 18, a second mirror 19, and a third mirror 110.

The slider units 14 and 15, the focusing lens 16, the linear image sensor 17, the illuminating device 2, and the mirrors 18, 19 and 110 are encased in the housing 11.

On the top surface of the housing 11, a rectangular opening is made. The platen glass 13 is fitted in the opening. On the platen glass 13, a document D is placed with its side to be read facing down.

The document cover 12 is provided on the top surface of the housing 11 so as to be opened and closed freely. When a user closes the document cover 12, the document cover 12 covers the document D.

As seen in FIG. 1, the illuminating device 2 is located under the platen glass 13. As illustrated in FIGS. 2-7, the illuminating device 2 comprises a light source 21 and a light guide 3. The light guide 3 generates a plurality of linear light beams L3 and L4 from a light beam L0 emitted by the light source 21 and emits the linear light beams L3 and L4 from two places thereof (two emission surfaces 316 and 326 as will be described later). As indicated in FIG. 1, the linear light beams L3 and L4 irradiate a reading area A of the document D on the platen glass 13. The reading area A means an area of the document D corresponding to one line of the document D in the main scanning direction x.

The mirrors 18, 19 and 110 guide light L5 (indicated by alternate long and short dash line) reflected from the document D to the focusing lens 16.

The illuminating device 2 and the mirror 18 are mounted on the first slider unit 14. During image reading of the document D, the first slider unit 14 carries the illuminating device 2 and the mirror 18 in the sub-scanning direction y along the lower surface of the platen glass 13 at a speed of V.

The mirrors 19 and 110 are mounted on the second slider unit 15. During the image reading of the document D, the second slider unit 15 carries the mirrors 19 and 110 in the sub-scanning direction y, keeping down away from the lower surface of the platen glass 13, at a speed of V/2. These actions of the sliders 14 and 15 keep the optical path length of the reflected light from the document D to the linear image sensor 17 constant during the image reading. Also, these actions allow the illuminating device 2 to irradiate all reading areas A of the document D with the linear beams L3 and L4 while moving in the sub-scanning direction y.

Light L6 reflected from the mirror 110 enters the focusing lens 16, and the focusing lens 16 transmits and focuses the light L6 on the linear image sensor 17. The linear image sensor 17 converts the light L6 focused on its receiving surface into electrical signals representing the three primary colors of light for each line of the document D in the main scanning direction x. As mentioned above, the illuminating device 2 irradiates the reading area A of the document D with the linear beam L4 from the forward side in the sub-scanning direction y and the linear beam L3 from the opposite side, and therefore, shadows are unlikely to be cast on the document D.

4. Detailed Structure of the Illuminating Device

Next, the structure of the illuminating device 2 will hereinafter be described in details. The light source 21 illustrated in FIGS. 2-6 is typically an LED (light emitting diode) which emits a white light beam L0. The light source 21 has a half-value angle of, for example, about 120 degrees. The half-value angle means an angle between rays of the light L0 emitted by the light source 21 having luminance of 50% when the luminance of a ray of the light L0 in the optical axis direction x is assumed to be 100%.

Figure 4:
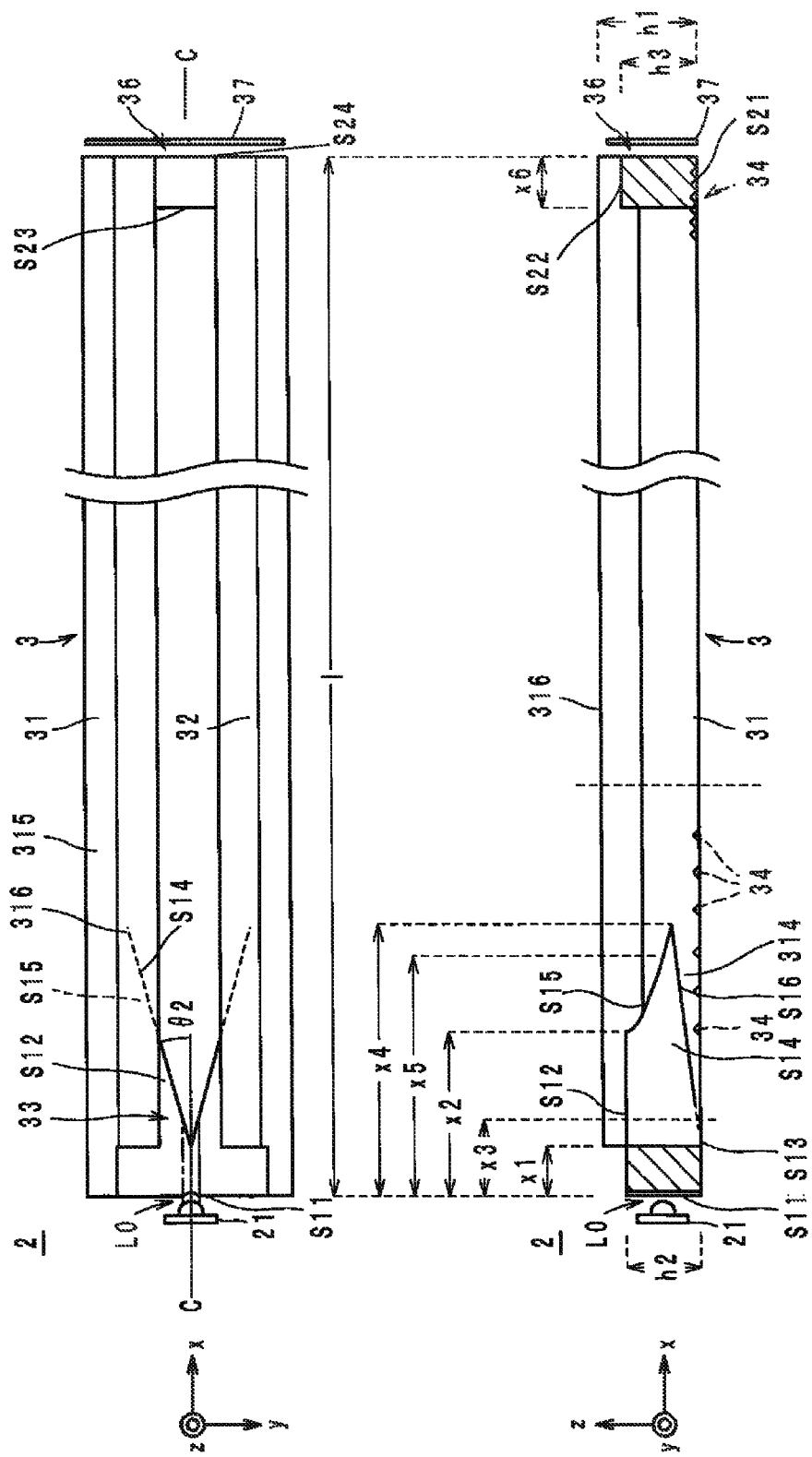
FIG. 4 illustrates the illuminating device illustrated in FIG. 2, where an upper panel indicates a plan view of the illuminating device when viewed from a height direction, and a lower panel indicates a sectional view of the illuminating device cut along a longitudinal median plane.

The light guide 3 has a length of about 300 mm (see especially FIG. 4). The light guide 3 is made of a transparent material having a high transmittance by monolithic molding. An example of this type of material is PMMA (polymethyl methacrylate). Alternatively, the light guide 3 may be made of glass. Moreover, the light guide 3 has a symmetrical shape with respect to a longitudinal median plane C. Here, the longitudinal median plane C is parallel to the zx-plane, and passes through the center of the light guide 3 in the width direction. Note that in FIG. 2, the longitudinal median plane C is shown only in part for the sake of clarity of the light guide 3.

5. Detailed Structure of the Light Guide

Next, the structure of the light guide 3 will hereinafter be described in details. As illustrated in FIGS. 3-6, the light guide 3 includes a left-side light guiding section 31, a right-side light guiding section 32, a splitting section 33, a left-side reflective section 34, a right-side reflective section 35, a connecting section 36, and a rear-end reflective section 37.

The light guiding sections 31 and 32 are in the form of rods extending in the length direction x and being symmetrical to each other with respect to the longitudinal median plane C. The light guiding sections 31 and 32 are arranged side by side in the width direction y with the splitting section 33 interposed therebetween. The splitting section 33 will be described later.

Figure 3:
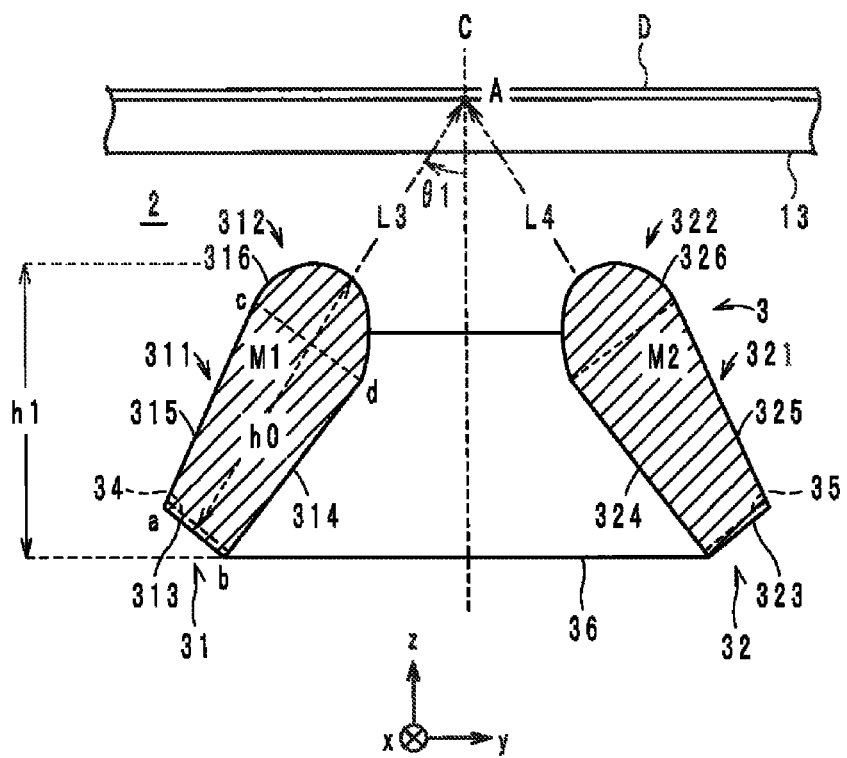
FIG. 3 is a cross-sectional view of the illuminating device cut along the line I-I' in FIG. 2, when viewed from a direction opposite to a length direction.

FIG. 3 illustrates a cross section M1 of the light guiding section 31 cut along the yz plane at an arbitrary position. For example, the cross section M1 almost at any position in the length direction x has a shape connecting a trapezoidal portion 311 and an elliptical arc portion 312. The trapezoidal portion 311 has a short base a-b and opposite sides (i.e., legs of the trapezoid) a-c and b-d. Note that the dotted line c-d is an imaginary line shared between the trapezoidal portion 311 and the elliptical arc portion 312, i.e., the dotted line c-d represents a long base of the trapezoidal portion 311 and also a chord of the elliptical arc portion 312.

In the cross section M1, a straight line h0 passing the reading position A is inclined from the longitudinal median plane C by angle θ1, and the trapezoidal portion 311 is positioned diagonally below the elliptical arc portion 312. In the present embodiment, for example, the straight line h0 passes an approximate midpoint of the base a-b and the vertex of the elliptical arc portion 312. Moreover, the cross section M1 (i.e., the light guiding section 31) has a height of h1 from a predetermined reference point, which, in this case, is the lowest point of the light guiding section 31. In other words, the height h1 is a distance in the height direction z from the predetermined reference point to the highest point of the light guiding section 31.

As can be appreciated from the above description, the light guiding section 31 includes a bottom surface 313, an interior side surface 314 and an exterior side surface 315, which are rectangular, and an emission surface 316, which is a curved surface whose cross section is in the shape of an elliptical arc.

The light guiding section 31 has been described as having a shape whose cross section M1 is the same almost at any position in the length direction x. However, as shown in the lower panel in FIG. 4, a portion of the light guiding section 31 from its front end to a point x1 in the length direction x (to a point at a distance x1 in the length direction from the front end), for example, a front-end portion having a length of about 5 mm preferably has a flat top surface parallel to the xy-plane and flush with a top surface S12, which will be described later.

The light guiding section 32 has a shape symmetrical to the light guiding section 31 with respect to the longitudinal median plane C, and is spaced apart from the light guiding section 31 in the width direction y. The space between the light guiding sections 31 and 32 increases with increasing distance from the reading position A downward. The light guiding section 32 has a bottom surface 323, an interior side surface 324, an exterior side surface 325 and an emission surface 326, which are respectively symmetrical to the bottom surface 313, the interior side surface 314, the exterior side surface 315 and the emission surface 316 with respect to the longitudinal median plane C.

As seen in FIGS. 4 and 5, the splitting section 33 is provided between the respective front-end portions of the light guiding sections 31 and 32. The splitting section 33 includes a light-receiving surface S11, a top surface S12, a bottom surface S13, a left interior sloping surface S14, a left bottom sloping surface S16, a right interior sloping surface S17 and a right bottom sloping surface S19.

The light-receiving surface S11 is substantially flat and is flush with the front-end surfaces of the light guiding sections 31 and 32. The light source 21 is positioned so as to face the light-receiving surface S11 with its optical axis parallel to the front-rear direction x on the longitudinal median plane C. The light-receiving surface S11 is preferably provided with a diffusing portion such as a groove extending in the height direction z. For details of the diffusing portion, refer to, for example, Japanese Laid-Open Patent Publication No. 2014-216688 (Japanese Patent Application No. 2013-090114).

The top surface S12 and the bottom surface S13 are parallel to the xy plane and are positioned on opposite sides in the height direction z. The bottom surface S13 is opposite the top surface S12 in the height direction z, and connects the front-end portions of the light guiding sections 31 and 32 to the bottom end of the light-receiving surface S11 and the bottom ends of the bottom sloping surfaces S16 and S19. On the other hand, the top surface S12 connects the front-end portions of the light guiding sections 31 and 32 to the top end of light-receiving surface S11 and the top ends of the interior sloping surfaces S14 and S17, which will be described later. The top surface S12 is preferably provided at a position where the distance between the interior side surfaces 314 and 324 is shortest (see FIG. 3).

Here, the distance between the surfaces S12 and S13 is h2 that is smaller than h1. Specifically, the height h2 is designed so as to satisfy the relationship of h1−h2≈2 mm. Moreover, the forward end in the length direction x of the top surface S12 is positioned at a distance x2 from the light-receiving surface S11 (see particularly the lower panel in FIG. 4). The distance x2 is designed so as to satisfy the relationship of x1<x2<x4 (as will be described later).

The left interior sloping surface S14, when viewed in a top view, extends from a point x1 on the optical axis (a point at a distance x1 from the light-receiving surface S11 in the optical axis direction x) in a direction inclined counterclockwise from the longitudinal median plane C at an angle θ2 (see particularly the upper panel in FIG. 4). The top side of the sloping surface S14 extends parallel to the length direction x up to a point slightly short of a point x2 on the optical axis (a point at a distance x2 from the light-receiving surface S11 in the optical axis direction x), and is bent obliquely downward at the point so as to extend along the interior side surface 314, as shown in the lower panel in FIG. 4. On the other hand, the bottom side of the sloping surface S14 extends obliquely upward from a point slightly short of a point x3 on the optical axis (a point at a distance x3 from the light-receiving surface S11 in the optical axis direction x), and meets the top side and the interior side surface 314 at a point slightly short of a point x4 on the optical axis (a point at a distance x4 from the light-receiving surface S11 in the optical axis direction x). Here, the distance x3 is designed so as to satisfy the relationship of x1<x3<x2, and the distance x4 is designed so as to satisfy the relationship of x2<x4. The left bottom sloping surface S16 connects the bottom side of the left interior sloping surface S14 and the light guiding section 31.

The right interior sloping surface S17 and the right bottom sloping surface S19 are shown in the left column in FIG. 5, and are respectively symmetrical to the left interior sloping surface S14 and the left bottom sloping surface S16 with respect to the longitudinal median plane C. Therefore, any detailed descriptions thereof will be omitted.

Here, cross-sectional shapes (sectional shapes perpendicular to the length direction x, that is, sectional shapes parallel to the yz plane) of the light guide 3 at four critical points of the splitting section 33 are shown in the left column in FIG. 5. More specifically, in the left column in FIG. 5, the cross-sectional shapes respectively at the points x3, x2, x5 and x4 (points at distances x3, x2, x5 and x4 from the light-receiving surface S11) are shown in the first, the second, the third and the fourth panels from the top. The distance x5 is greater than x2 but less than x4. As is apparent from the left column in FIG. 5, as going forward in the length direction x from the point slightly short of the point x3, the cross-sectional shape of the splitting section 33 decreases in dimensions both in the width direction y and in the height direction z.

For comparison, FIG. 5 shows, in the right column, cross-sectional shapes (sectional shapes parallel to the yz-plane) of a light guide at four critical points of a splitting section 33'. In the splitting section 33' of the light guide, an interior side surface 314' of a light guiding section 31' and an interior side surface 324' of a light guiding section 32' are parallel to each other, and a left interior sloping surface S14' and a right interior sloping surface S17' have a constant height in the top-bottom direction z. In this case, as going forward in the length direction x from the point slightly short of the point x3, the cross-sectional shape of the splitting section 33' decreases only in dimension in the width direction y.

As illustrated in FIGS. 4 and 6, the reflective section 34 includes a number of prisms arranged in the front-rear direction x on the bottom surface 313 of the light guiding section 31. Here, the end of the reflective section 34 in the opposite direction to the length direction x (i.e., the front end of the reflective section 34) is positioned farther in the opposite direction to the length direction x (i.e., farther in the direction toward the front side) than the forward end in the length direction x of the splitting section 33 (i.e., the rear end of the splitting section 33); see particularly the lower panel in FIG. 4. The rear end of the reflective section 34 is located approximately at the same position as the rear end of the light guiding section 31.

Further, although not shown for the sake of convenience, the reflective section 35 includes a number of prisms arranged so as to be plane-symmetrical to the prisms of the reflective section 34 with respect to the longitudinal median plane C. Accordingly, as in the case of the reflective section 34, the front end of the reflective section 35 is positioned farther in the direction toward the front side than the rear end of the splitting section 33 (see particularly the lower panel in FIG. 4).

Furthermore, the reflective sections 34 and 35 are designed so as to achieve suitable light distribution characteristics of the linear beams L3 and L4 generated by the light guide 3. In the present embodiment, the term "suitable light distribution characteristics" refers to a state where the intensity of the linear beams L3 and L4 is higher at the both ends in the length direction x than at the center.

The connecting section 36 is provided between the rear-end portions of the light guiding sections 31 and 32 in order to connect the rear-end portions. For this purpose, the connecting section 36 includes a bottom surface S21, a top surface S22, a front surface S23 and a rear surface S24.

The bottom surface S21 and the top surface S22 are parallel to the xy-plane and are opposite each other in the height direction z. The surfaces S21 and S22 have a dimension x6 in the front-rear direction x. The bottom surface S21 connects the rear-end portion of the light guiding section 31, the rear-end portion of the light guiding section 32, the bottom end of the front surface S23 and the bottom end of the rear surface S24 to one another. On the other hand, the top surface S22 is positioned at a distance h3 (h3<h1) from the bottom surface S21 in the height direction z, and connects the rear-end portions of the light guiding sections 31 and 32, the top end of the front surface S23 and the top end of the rear surface S24 to one another. Here, the heights h1 and h3 are designed so as to satisfy the relationship of h1−h3≈2 mm.

The front surface S23 and the rear surface S24 are surfaces parallel to the yz-plane and are opposite each other in the length direction z. The front surface S23 and the rear surface S24 are positioned between the rear-end portions of the light guiding sections 31 and 32. The front surface S23 connects the front ends of the bottom surface S21 and the top surface S22, while the rear surface S24 connects the rear ends of the surfaces S21 and S22. Note that the rear surface S24 is flat and flush with the rear-end surfaces of the light guiding sections 31 and 32.

The rear-end reflective section 37 is, for example, a white sheet-like member having approximately the same shape as the rear-end surface of the light guide 3 when viewed in a front view. The rear-end reflective section 37 is positioned so as to face the rear-end surface of the light guide 3.

6. Generation and Emission of Linear Beams

Next, the process of emitting the linear beams L3 and L4 from the illuminating device 2 will be described with reference to FIG. 7. First, the light L0 emitted by the light source 21 enters the light guide 3 through the light-receiving surface S11. A part of the light L0 that has entered through the light-receiving surface S11 propagates inside the splitting section 33, and the part of the light is total-reflected mainly by the sloping surfaces S14 and S17. Thereby, the light is split into two beams L1 and L2, and the two beams L1 and L2 are introduced respectively into the light guiding sections 31 and 32. The rest of the light L0 that has entered through the light-receiving surface S11 is directly introduced into the light guiding sections 31 and 32 as a component of the light beam L1 and as a component of the light beam L2. In FIG. 7, the light beams L1 and L2 entering the light guiding sections 31 and 32 are indicated with alternate long and short dash line.

In the light guiding section 31, the light beam L1 propagates in the length direction x while being total-reflected at the interface with the outside (mainly on the surfaces 314-316). During this process, a part of the light beam L1 is reflected by the reflective section 34 and is directed up toward the emission surface 316. The part of the light beam L1 reflected by the reflective section 34 is incident on the emission surface 316 at an angle smaller than the critical angle and, therefore, is emitted to the outside as a linear light beam L3.

Although not shown for the sake of convenience, in the light guiding section 32 also, as is the case with the light beam L1 entering the light guiding section 31, the light beam L2 propagates in the length direction x while being total-reflected at the interface with the outside (mainly on the surfaces 324-326). During this process, a part of the light beam L2 is reflected by the reflective section 35 and is directed up toward the emission surface 326. Thus, a linear light beam L4 is generated from the light beam L2, and the light beam L4 is emitted to the outside.

As described above, the linear light beams L3 and L4 are emitted from the light guiding sections 31 and 32 through the emission surfaces 316 and 326, respectively. When viewed from the front side, each of the emission surfaces 316 and 326 is in the shape of an elliptical arc, and accordingly, the light beams L1 and L2 emitted through the emission surfaces 316 and 326 are converged on the reading position A. Parts of the light beams L1 and L2 which have reached the rear ends of the light guiding sections 31 and 32 without being reflected by the reflective sections 34 and 35 are reflected by the rear-end reflective section 37 and are introduced into the light guiding sections 31 and 32 again. Alternatively, the parts of the light beams L1 and L2 which have reached the rear ends of the light guiding sections 31 and 32 are introduced into the light guiding sections 32 and 31 again via the connecting section 36 and the rear-end reflective section 37.

7. Actions and Effects of the Light Guide and Other Components

In the light guide 3, as will be appreciated from the foregoing, the ends of the light guiding sections 31 and 32 in the opposite direction to the length direction x (i.e., the front ends of the light guiding sections 31 and 32) are positioned farther in the opposite direction to the length direction x (i.e., farther in the direction toward the front side) than the forward end of the splitting section 33 in the length direction x (i.e., the rear end of the splitting section 33). In other words, the front ends of the interior side surfaces 314 and 324 and the front ends of the emission surfaces 316 and 326 are positioned farther in the direction toward the front side than the rear end of the splitting section 33. Therefore, the front-end portions of the light guiding sections 31 and 32 contribute to the generation of the linear light beams L3 and L4. Accordingly, even if the light guide 3 according to the embodiment has a reduced length as compared to a conventional light guide, the light guide 3 can generate the linear light beams L3 and L4.

In the light guide 3, the ends of the reflective sections 34 and 35 in the opposite direction to the length direction x (i.e., the front ends of the reflective sections 34 and 35) are positioned farther in the opposite direction to the length direction (i.e., farther in the direction toward the front side) than the forward end of the splitting section 33 in the length direction x (i.e., the rear end of the splitting section 33). This permits the front ends of the light guiding sections 31 and 32 to contribute to the generation of the light beams L3 and L4 more. Accordingly, even if the light guide 3 has a more reduced length as compared to a conventional light guide, the light guide 3 can generate the linear light beams L3 and L4.

In the light guide 3, the position in the height direction z of the top surface S12 of the splitting section 33 is lower than the position in the height direction z of the highest points of the light guiding sections 31 and 32 (specifically, the emission surfaces 316 and 326). In other words, at least a part of the splitting section 33 has a lower height than either of the light guiding sections 31 and 32. Note that the reference point for height is, for example, the lowest point of the light guide 3. With this arrangement, the light guide 3 can generate the linear beams L3 and L4 with the emission surfaces 316 and 326 little influenced by the splitting section 33. Accordingly, even if the light guide 3 has a still more reduced length as compared to a conventional light guide, the light guide 3 can generate the linear light beams L3 and L4.

In the light guide 3, the position in the height direction z of the top surface S22 of the connecting section 36 is lower than the position in the height direction z of the highest points of the emission surfaces 316 and 326. Note that the reference point for height is, for example, the lowest point of the light guide 3. With this arrangement, the light guide 3 can generate the linear beams L3 and L4 with the emission surfaces 316 and 326 little influenced by the connecting section 36. Accordingly, even if the light guide 3 has a still more reduced length as compared to a conventional light guide, the light guide 3 can generate the linear light beams L3 and L4.

In the light guide 3, the emission surfaces 316 and 326 are provided to span the light guiding sections 31 and 32, respectively, almost entirely in the length direction. Accordingly, even if the light guide 3 has a still more reduced length as compared to a conventional light guide, the light guide 3 can generate the linear light beams L3 and L4.

In the light guide 3, as seen in FIG. 4, the top side of the sloping surface S14 is bent obliquely downward at a point in the middle, and the sloping surface S16 extends obliquely upward. The top side of the sloping surface S14 meets the sloping surface S16 at a point slightly short of the point x4. With this arrangement, the splitting section 33 does not extend too far in the length direction x, and at a point at a short distance from the light-receiving surface S11, the interior side surface 314 of the light guiding section 31 appears. Thereby, the light guiding section 31 can generate the linear beam L3 with little influenced by the splitting section 33. Accordingly, even if the light guiding section 31 has a more reduced length as compared to that of a conventional light guide, the light guiding section 31 can generate the linear light beam L3. This applies the light guiding section 32 also.

8. Supplementary 1

Figure 8:
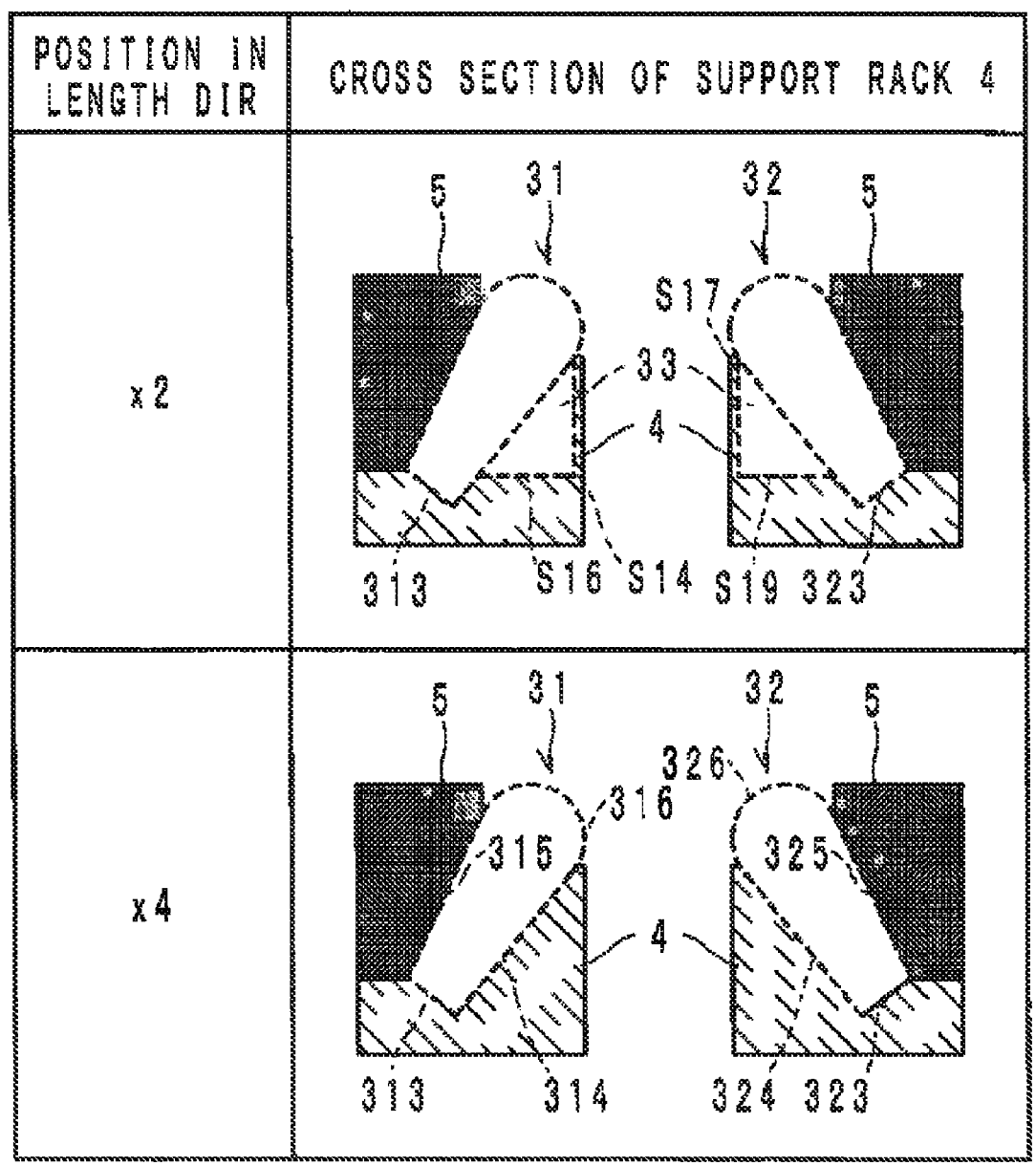
FIG. 8 is a diagram illustrating cross-sections of a support rack of the illuminating device illustrated in FIG. 2 and a light-shielding member for light guiding sections.

In the illuminating device 2, the light guide 3 is supported by a support rack 4 as illustrated in the upper and lower panels in FIG. 8. In FIG. 8, for easy viewing of the support rack 4, the light guiding sections 31 and 32 are outlined by broken lines. In an area located forward in the length direction x from the point x4, the support rack 4 supports the light guide 3 by contacting almost the entirety of the bottom surface 313 and the interior side surface 314 and also almost the entirety of the bottom surface 323 and the interior side surface 324 (see the lower panel in FIG. 8). On the other hand, in an area forward in the opposite direction to the length direction x from the point x4, the support rack 4 supports the light guide 3 by contacting almost the entirety of the interior sloping surfaces S14 and S17 and the bottom sloping surfaces S16 and S19, as well as the bottom surfaces 313 and 323 (see the upper panel in FIG. 8). As described above, in the light guiding sections 31 and 32, basically, the beams L1 and L2 propagate in the length direction x while being total-reflected repeatedly. However, it is envisaged that the beams L1 and L2 might escape to the outside through the bottom surfaces 313 and 323 and the interior side surfaces 314 and 324 due to scattering at boundary surfaces between the light guiding sections 31 and 32 and the outside or due to reflection/refraction by the reflective sections 34 and 35. Therefore, the surfaces of the support rack 4 that contact with the bottom surfaces 313 and 323 and the interior side surfaces 314 and 324 are preferably covered with a white resin layer or a mirror surface.

Figure 9:
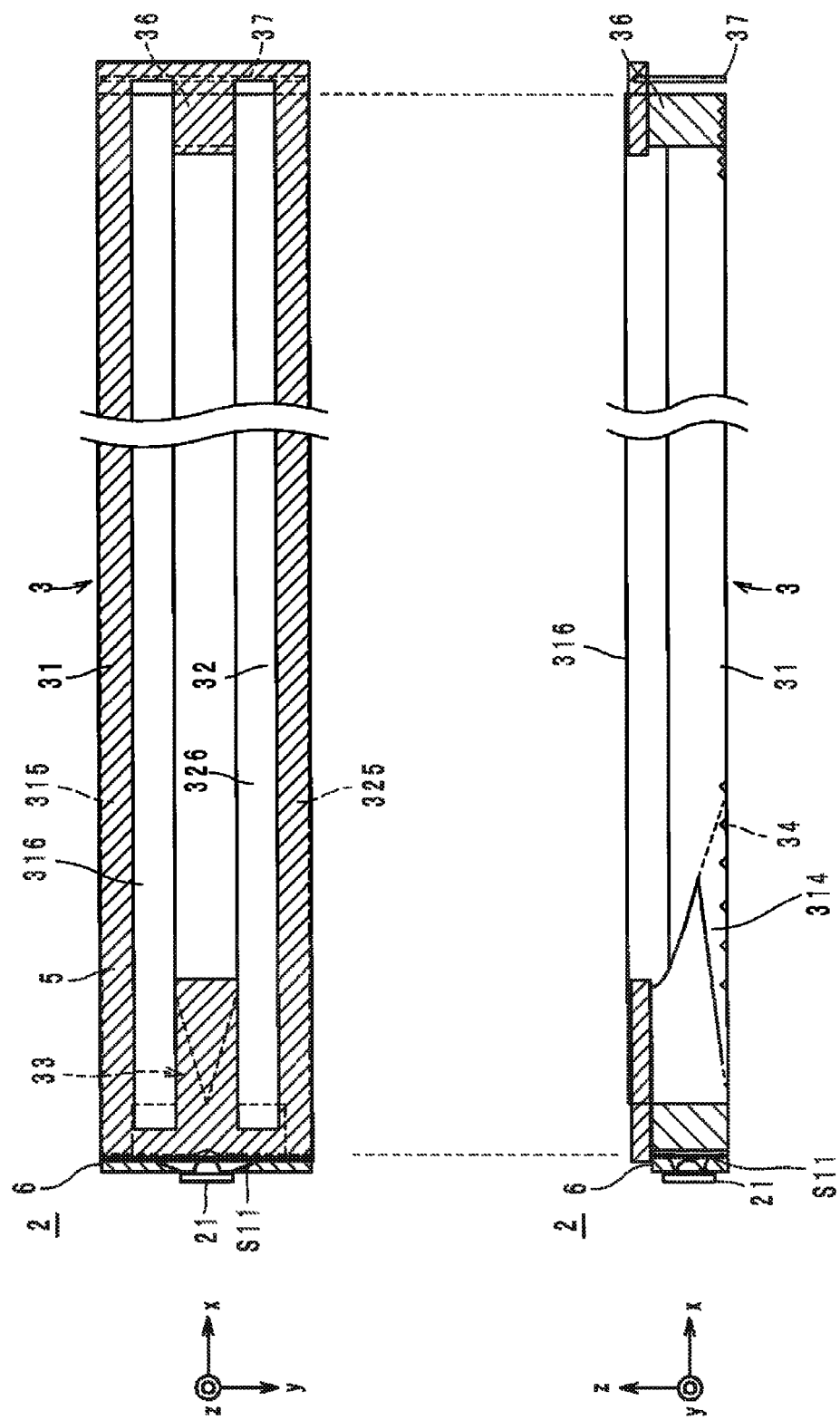
FIG. 9 is a top view of the light-shielding member for the light guiding sections.

As shown in FIG. 8, almost the entirety of the exterior side surfaces 315 and 325, excluding the emission surfaces 316 and 326, is preferably covered by a light-shielding member 5, which is an optical absorber such as a black resin layer or a black tape. It is also preferable that the light-shielding member 5 also covers the top surface of the splitting section 33, the flat front-end portions of the light guiding sections 31 and 32 and the top surface S22 of the connecting section 36 integrally as well, as shown in FIG. 9. Note that in FIG. 9, the light-shielding member 5 is represented by hatching from upper left to lower right.

Here, considering irradiation efficiency for the document D, the light guide 3 is desirably disposed as close to the document D as possible while leaving some room for tolerance. In view of such background, as described above, the front-end portions of the light guiding sections 31 and 32 have a lower height than the height h1 of the highest points of the emission surfaces 316 and 326, and the top surfaces of the front-end portions of the light guiding sections 31 and 32 are formed as flat surfaces having a dimension of about 5 mm in the length direction x. By disposing the light-shielding member 5 on the flat portion where the emission surfaces 316 and 326 are not formed, it becomes possible to cover the front-end portions of the light guiding sections 31 and 32 by the light-shielding member 5 while keeping the vertices of the emission surfaces 316 and 326 close to the document D.

The foregoing is not limiting, and the respective surfaces of the light guide 3, excluding the emission surfaces 316 and 326, may be covered by reflective sheets. In this case, components of the beams L1 and L2 that have escaped from the light guide 3 can be reused, so that a decrease in the irradiation efficiency for the document D can be inhibited.

Figure 10:
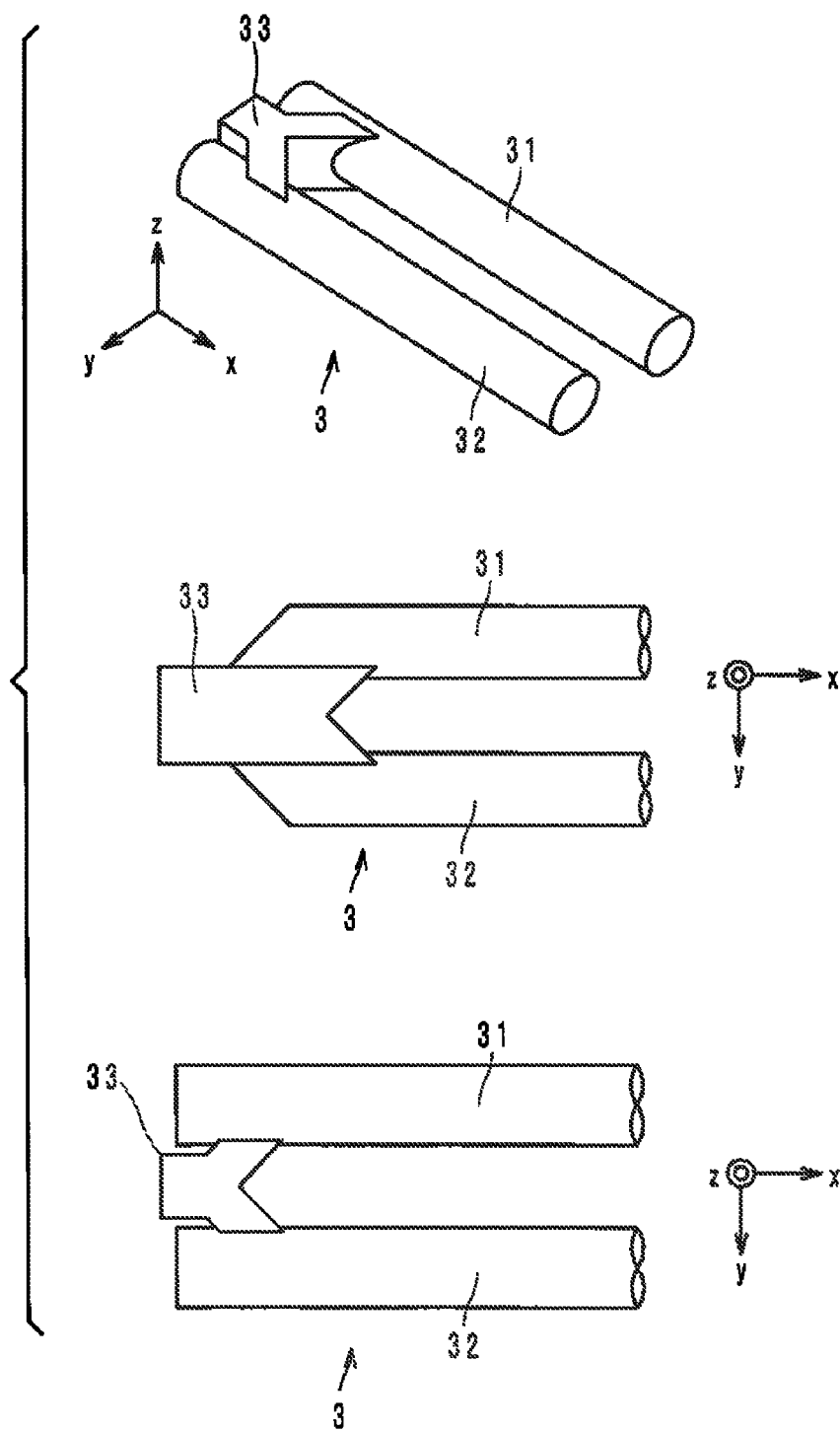
FIG. 10 illustrates light guides according to some modifications.

To allow the entirety of the light L0 to be incident on the light-receiving surface S11, the light source 21 may be positioned using a light-concentrating attachment 6 (see FIG. 10).

The light-receiving surface S11 does not have to be parallel to the yz-plane, and may be inclined downward, for example.

In the embodiment above, the splitting section 33 splits the introduced light L0 into two beams. However, this is not limiting, and the splitting section 33 may split the introduced light L0 into a number equal to the number of light guiding sections (e.g., three or four).

Furthermore, the cross section of the light guiding sections 31 and 32 is not limited to the shape shown in FIG. 3, and may be, for example, a circular shape without clear boundaries among the bottom surfaces, the side surfaces, and the emission surfaces, as shown in the upper panel in FIG. 10.

In the embodiment above, the right and the left sides of the splitting section 33 entirely overlap the light guiding sections 31 and 32. However, as shown in the middle panel in FIG. 10, the right and the left sides of the splitting section 33 may at least partly overlap the light guiding sections 31 and 32.

In the embodiment above, the light-receiving surface S11, the top surface S12 and the bottom surface S13 of the splitting section 33 are connected directly to the light guiding sections 31 and 32 in the width direction y. However, as shown in the lower panel in FIG. 10, for example, the light receiving surface S10 does not have to be connected directly to the light guiding sections 31 and 32 in the width direction y.

Although the present invention has been described in connection with the preferred embodiment above, it is to be noted that various changes and modifications are possible to those who are skilled in the art. Such changes and modifications are to be understood as being within the scope of the invention.

What is claimed is:

1. A light guide comprising:
   a splitting section configured to split light emitted by a light source into at least two; and
   at least two light guiding sections arranged side by side in a predetermined width direction and configured to cause the light entering from the splitting section to propagate in a predetermined length direction that is perpendicular to the width direction, wherein:
   the splitting section extends from the light source in the length direction, and has a proximal end proximate the light source and a distal end located distally from the light source and opposite to the proximal end;
   each of the light guiding sections includes:
   a reflective section provided along the length direction and configured to reflect light incident thereon; and
   an emission surface arranged opposite the reflective section and configured to emit the light reflected by the reflective section as a linear light beam having predetermined light distribution in the length direction; and
   the emission surface extends in the length direction so that a first end of the emission surface extends beyond the distal end of the splitting section in the length direction and a second end of the emission surface is located closer to the light source than the distal end of the splitting section.

2. The light guide according to claim 1, wherein at least a part of the reflective section is located farther in the direction opposite to the length direction than the forward end of the splitting section in the length direction.

3. The light guide according to claim 1, wherein, when a direction of a component perpendicular to the length direction and the width direction of a direction of emission of the linear light beam from the emission surface is referred to as a height direction, a position in the height direction of a highest point of the splitting section from a predetermined reference point is lower than a position in the height direction of a highest point of each of the light guiding sections from the reference point.

4. The light guide according to claim 1, wherein, when a direction of a component perpendicular to the length direction and the width direction of a direction of emission of the linear light beam from the emission surface is referred to as a height direction, a position in the height direction of a highest point of the splitting section from a predetermined reference point is lower than a position in the height direction of a highest point of the emission surface from the reference point.

5. The light guide according to claim 1, further comprising a connecting section connecting forward ends in the length direction of the at least two light guiding sections to each other, wherein:
   when a direction of a component perpendicular to the length direction and the width direction of a direction of emission of the linear light beam from the emission surface is referred to as a height direction, a position in the height direction of a highest point of the connecting section from a predetermined reference point is lower than a position in the height direction of a highest point of the emission surface from the reference point.

6. The light guide according to claim 1, wherein the emission surface spans the corresponding light guiding section almost entirely in the length direction.

7. The light guide according to claim 6, wherein, in each of the light guiding sections, the emission surface is not formed in an end portion of the light guiding section in the direction opposite to the length direction.

8. An illuminating device comprising:
   a light source; and
   the light guide according to claim 1.

9. An image reading apparatus comprising:
   the illuminating device according to claim 8; and
   an image pick-up element configured to receive light emitted from the light source and reflected by a document.

10. The image reading apparatus according to claim 9, wherein at least a part of the reflective section is located farther in the direction opposite to the length direction than the forward end of the splitting section in the length direction.

11. The image reading apparatus according to claim 9, wherein, when a direction of a component perpendicular to the length direction and the width direction of a direction of emission of the linear light beam from the emission surface is referred to as a height direction, a position in the height direction of a highest point of the splitting section from a predetermined reference point is lower than a position in the height direction of a highest point of each of the light guiding sections from the reference point.

12. The image reading apparatus according to claim 9, wherein, when a direction of a component perpendicular to the length direction and the width direction of a direction of emission of the linear light beam from the emission surface is referred to as a height direction, a position in the height direction of a highest point of the splitting section from a predetermined reference point is lower than a position in the height direction of a highest point of the emission surface from the reference point.

13. The image reading apparatus according to claim 9, wherein:
the light guide further comprises a connecting section connecting forward ends in the length direction of the at least two light guiding sections to each other; and
when a direction of a component of a direction of emission of the linear light beam from the emission surface perpendicular to the length direction and the width direction is referred to as a height direction, a position in the height direction of a highest point of the connecting section from a predetermined reference point is lower than a position in the height direction of a highest point of the emission surface from the reference point.

14. The image reading apparatus according to claim 9, wherein the emission surface spans the corresponding light guiding section almost entirely in the length direction.

15. The image reading apparatus according to claim 14, wherein, in each of the light guiding sections, the emission surface is not formed in an end portion of the light guiding section in the direction opposite to the length direction.

16. The illuminating device according to claim 8, wherein at least a part of the reflective section is located farther in the direction opposite to the length direction than the forward end of the splitting section in the length direction.

17. The illuminating device according to claim 8, wherein, when a direction of a component perpendicular to the length direction and the width direction of a direction of emission of the linear light beam from the emission surface is referred to as a height direction, a position in the height direction of a highest point of the splitting section from a predetermined reference point is lower than a position in the height direction of a highest point of each of the light guiding sections from the reference point.

18. The illuminating device according to claim 8, wherein, when a direction of a component perpendicular to the length direction and the width direction of a direction of emission of the linear light beam from the emission surface is referred to as a height direction, a position in the height direction of a highest point of the splitting section from a predetermined reference point is lower than a position in the height direction of a highest point of the emission surface from the reference point.

19. The illuminating device according to claim 8, wherein:
the light guide further comprises a connecting section connecting forward ends in the length direction of the at least two light guiding sections to each other:
when a direction of a component perpendicular to the length direction and the width direction of a direction of emission of the linear light beam from the emission surface is referred to as a height direction, a position in the height direction of a highest point of the connecting section from a predetermined reference point is lower than a position in the height direction of a highest point of the emission surface from the reference point.

20. The illuminating device according to claim 8, wherein the emission surface spans the corresponding light guiding section almost entirely in the length direction.

21. The illuminating device according to claim 20, wherein, in each of the light guiding sections, the emission surface is not formed in an end portion of the light guiding section in the direction opposite to the length direction.

* * * * *